(12) United States Patent
Ko et al.

(10) Patent No.: US 8,107,354 B2
(45) Date of Patent: Jan. 31, 2012

(54) ELECTRIC FIELD READ/WRITE HEAD, METHOD OF MANUFACTURING THE SAME, AND INFORMATION STORAGE DEVICE COMPRISING ELECTRIC FIELD READ/WRITE HEAD

(75) Inventors: Hyoung-soo Ko, Seoul (KR); Ju-hwan Jung, Seoul (KR); Seung-bum Hong, Seongnam-si (KR); Chul-min Park, Yongin-si (KR); Dae-young Jeon, Mokpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 785 days.

(21) Appl. No.: 12/038,878

(22) Filed: Feb. 28, 2008

(65) Prior Publication Data
US 2009/0034120 A1 Feb. 5, 2009

(30) Foreign Application Priority Data
Aug. 3, 2007 (KR) ........................ 10-2007-0078208

(51) Int. Cl.
*G11B 5/187* (2006.01)
*G11B 9/02* (2006.01)
(52) U.S. Cl. .................. 369/126; 369/101; 369/122
(58) Field of Classification Search .................. 369/126, 369/13.24, 13.33, 101, 122
See application file for complete search history.

(56) References Cited

U.S. PATENT DOCUMENTS

| | | | | |
|---|---|---|---|---|
| 6,438,092 B1 * | 8/2002 | Hoshino | ........................ | 369/126 |
| 2004/0141427 A1 * | 7/2004 | Mishima et al. | ............ | 369/13.33 |
| 2005/0135224 A1 * | 6/2005 | Mejia et al. | ..................... | 369/126 |
| 2005/0214966 A1 * | 9/2005 | Park et al. | ......................... | 438/48 |
| 2006/0092817 A1 * | 5/2006 | Ko et al. | ......................... | 369/126 |
| 2006/0099461 A1 * | 5/2006 | Jones et al. | ................ | 428/835.8 |
| 2007/0041584 A1 * | 2/2007 | O'Connor et al. | .............. | 380/45 |

FOREIGN PATENT DOCUMENTS
WO 03/096409 A1 11/2003
* cited by examiner

Primary Examiner — Will J Klimowicz
Assistant Examiner — Andrew Sasinowski
(74) Attorney, Agent, or Firm — Sughrue Mion, PLLC (57) ABSTRACT

An electric field read/write head, a method of manufacturing the electric field read/write head, and an information storage device including the electric field read/write head are provided. The electric field read/write head includes: a substrate having a first surface facing a recording medium and a second surface that is perpendicular to the first surface; and a protrusion formed on the second surface and having at least a portion facing the recording medium, wherein a resistance sensor comprising a source, a drain, and a channel is included in the protrusion. An insulating layer and electric field shield layers are further sequentially formed on opposite sides of the protrusion, respectively, and at least one of the electric field shield layers is a write electrode.

19 Claims, 11 Drawing Sheets

ELECTRIC FIELD READ/WRITE HEAD, METHOD OF MANUFACTURING THE SAME, AND INFORMATION STORAGE DEVICE COMPRISING ELECTRIC FIELD READ/WRITE HEAD

CROSS-REFERENCE TO RELATED PATENT APPLICATIONS

This application claims priority from Korean Patent Application No. 10-2007-0078208, filed on Aug. 3, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to a read/write head, a method of manufacturing the same, and an information storage device and, more particularly, to an electric field read/write head, a method of manufacturing the same, and an information storage device including the electric field read/write head.

2. Description of the Related Art

A hard disk drive (HDD), i.e., the primary storage device of a computer, operates by spinning a data recording medium and suspending a read/write head over it so as to read and write data. A conventional HDD generally uses magnetic writing. In this case, the HDD generates a magnetic field to create a plurality of magnetic domains magnetized in a first direction on the magnetic recording medium and in a second direction opposite to the first direction. The magnetic domains magnetized in the first and second directions correspond to data '0' and data '1', respectively.

The writing densities of HDDs employing the magnetic writing method have increased tremendously over the last few decades. Horizontal magnetic writing can result in a recording density of approximately 100 $Gb/in^2$, and vertical magnetic writing can result in a recording density of approximately 500 $Gb/in^2$.

However, because a magnetic field has generally a loop shape, a magnetic read/write head can have difficulty forming a strong localized magnetic field. This basic limitation restricts the possibility to increase the recoding density in the case of the magnetic writing method.

Accordingly, in order to increase the recording density of HDDs, other writing methods must be considered.

Recently, much research has been conducted on ferroelectric writing media (on which data is written using electric fields) and corresponding read/write heads (electric field read/write heads). In the electric field writing method, an electric field is generated to form electric domains polarized in a first direction and in a second direction opposite to the first direction on a ferroelectric surface. The electric domains polarized in the first and second directions correspond to data '0' and data '1', respectively. According to the polarized direction of an electric domain, the resistance of the electric field read/write head above that domain changes so that the data written in the electric domain can be discerned.

An electric field read/write head used in the electric field writing method has a scanning probe with a field effect transistor channel configuration, a scanning probe with a resistive tip, etc. When a scanning probe microscope (SPM) technology in which the above scanning probe is employed is used, a stronger and more localized energy (electric field) can be emitted in electric field writing, thereby increasing the recording density to 1 $Tb/in^2$ or higher.

However, in the electric field writing method based on SPM technology, problems related to friction and wear arise due to the contact between the surfaces of a sharp probe and a recording medium. Also, in order to use a probe-type head to form a compact and large-capacity data storage device, several thousand probe arrays must be made, and the writing head including thousands of the probe arrays must be precisely linearly moved above the recording medium. In this case, during a writing operation, signals must be applied separately to each probe, and during a reading operation, signals from the respective probes must be processed separately. These factors hinder the realization of a compact, large capacity data storage device that uses electric field writing based on SPM technology.

Thus, a new read/write head that can overcome the above problems, and an electric field writing-type data read/write device having a driving mechanism that is more secure and reliable are required.

SUMMARY OF THE INVENTION

Exemplary embodiments of the present invention provide an electric field read/write head that can be driven stably and realize a recording density of 1 $Tb/in^2$ or greater.

The present invention also provides a method of manufacturing the electric field read/write head.

The present invention also provides an information storage device including the electric field read/write head and a stable driving system.

According to an aspect of the present invention, there is provided an electric field head comprising: a substrate having a first surface facing a recording medium and a second surface that is perpendicular to the first surface; and a protrusion formed on the second surface and having at least a portion facing the recording medium, wherein the protrusion includes a resistance sensor comprising a source, a drain, and a channel.

The protrusion may be extended from a first end to a second end of the second surface and may be perpendicular to the first surface.

The protrusion may comprise: a first portion that is adjacent to the first surface; and a remaining portion contacting the first portion, wherein the width of the first portion may be smaller than the width of the remaining portion.

The remaining portion may comprise: a second portion contacting the first portion; and a third portion contacting the second portion, wherein the width of the second portion may be increased away from the first portion to the third portion.

The width of the second portion contacting the first portion may be equal to the width of the first portion, and the width of the second portion contacting the third portion may be equal to the width of the third portion.

An insulating layer and an electric field shield layer may be further sequentially formed on each of opposite sides of the protrusion that do not face the recording medium.

The electric field shield layer may be a conductive layer.

One of the electric field shield layers on opposite sides of the protrusion may be a writing electrode.

The protrusion and the substrate on opposite sides of the protrusion may be covered by the insulating layer.

The source, the drain, and the channel may be formed in the protrusion adjacent to the first surface so as to be perpendicular to the first surface, the source and the drain may be formed at a first side and a second side of the protrusion, and the channel may be formed between the source and the drain.

The source and the drain may respectively extend to the substrate on opposite sides of the protrusion.

The electric field head may further comprise an air bearing surface (ABS) pattern layer on the first surface of the substrate.

A passivation layer may further be formed on the substrate to cover the resistance sensor, the insulating layer, and the electric field shield layer.

According to another aspect of the present invention, there is provided a method of manufacturing an electric field head comprising a reading unit, the method comprising: forming a protrusion on a substrate; and forming a source and a drain on a portion of the protrusion facing a recording medium.

After forming the source and the drain, the method may further comprise: forming an insulating layer covering the protrusion on the substrate; and forming an electric field shield layer on the insulating layer formed on sides of the protrusion that face each other.

The electric shield layer may be a conductive layer.

One of the electric shield layers disposed on the sides of the protrusion may be a write electrode.

The protrusion may be extended from a first point to a second point on the substrate, and may be perpendicular to a surface of the electric field head which face the recording medium.

The protrusion may comprise: a first portion formed at the first point on the substrate; and a remaining portion contacting the first portion, wherein the width of the first portion is smaller than the width of the remaining portion, and the first portion may face the recording medium.

The remaining portion may comprise: a second portion contacting the first portion; and a third portion contacting the second portion, wherein the width of the second portion may be increased away from the first portion to the third portion.

The width of the second portion contacting the first portion may be equal to the width of the first portion, and the width of the second portion contacting the third portion may be equal to the width of the third portion.

The source and the drain may be formed at a first side and a second side of the portion of the protrusion facing the recording medium and to be perpendicular to the recording medium.

The source and the drain may be respectively formed to extend to the substrate on opposite sides of the protrusion.

The source and the drain may be formed using an inclination ion injection process.

The method may further comprise, after forming an electric field shield layer, forming a passivation layer on the substrate to cover the electric field shield layer and the insulating layer.

The method may further comprise, after forming the source and the drain, forming an air bearing surface (ABS) pattern layer on a surface of the electric field head facing the recording medium.

According to another aspect of the present invention, there is provided an information storage device comprising an electric field head and a recording medium including a ferroelectric recording layer, wherein the electric field head comprises: a substrate having a first surface facing the recording medium and a second surface that is perpendicular to the first surface; and a protrusion disposed on the second surface and having at least a portion facing the recording medium, wherein a resistance sensor comprising a source, a drain, and a channel is included in the protrusion.

The recording medium may be a rotating disk-type medium, and the electric field head may move at a predetermined distance across a surface of the recording medium.

The information storage device may further comprise a suspension to which the electric field head is attached to rotate.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown. The widths or thicknesses of layers or regions illustrated in the drawings are exaggerated for clarity. Like reference numerals denote like elements.

Figure 1:
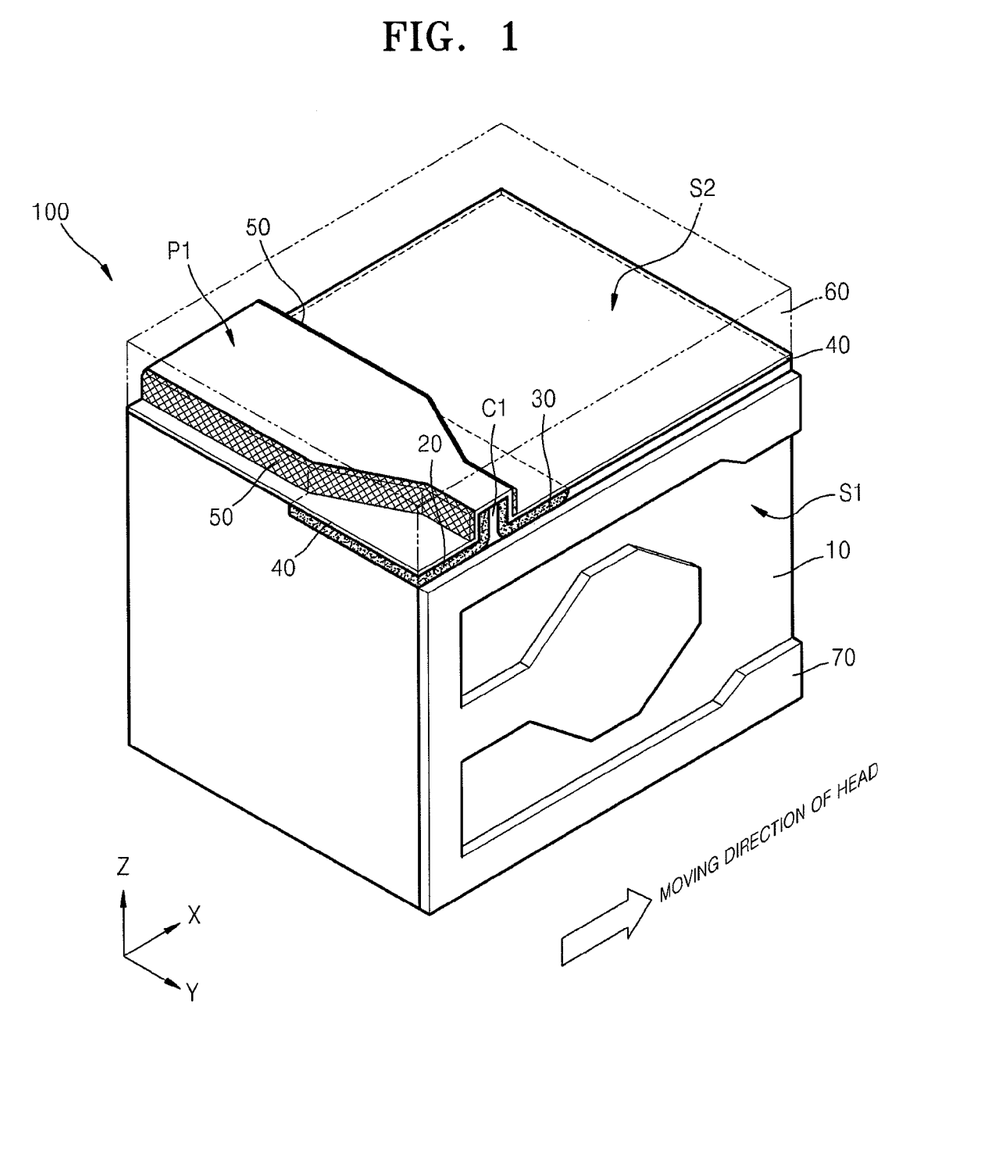
FIG. 1 is a perspective view of an electric field read/write head according to an exemplary embodiment of the present invention.

FIG. 1 is a perspective view of an electric field read/write head 100 according to an exemplary embodiment of the present invention.

Referring to FIG. 1, a substrate 10 has a first surface S1 and a second surface S2, which are perpendicular to each other. The first surface S1 faces a recording medium, and the second surface S2 is an upper surface of the substrate 10. The substrate 10 may be a p-type or an n-type semiconductor.

Figure 2:
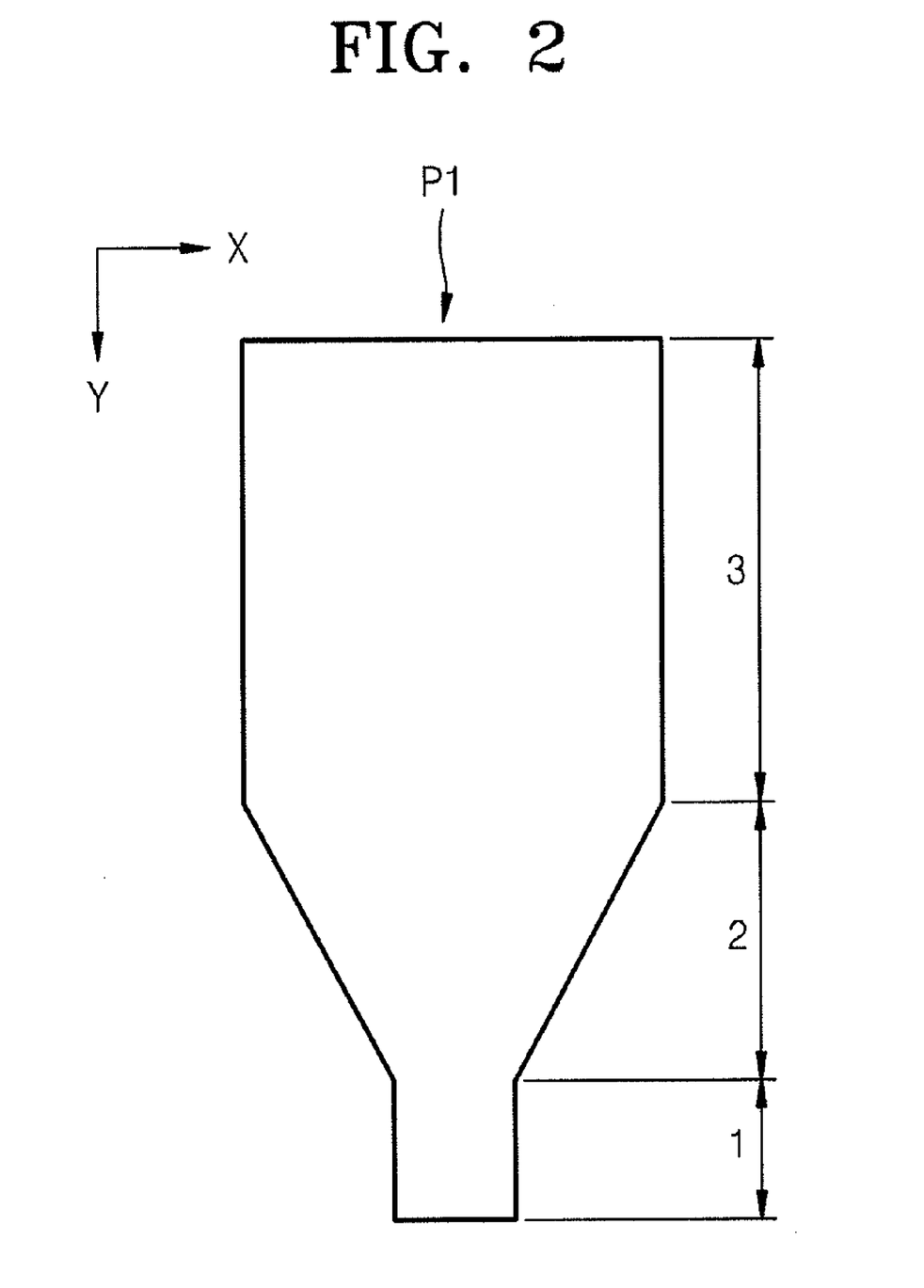
FIG. 2 is a plane view illustrating a protrusion of FIG. 1.

The substrate 10 has a protrusion P1 on the second surface S2. The protrusion P1 may extend from a first end of the second surface S2 to a second end of the second surface S2 in a y-direction. The first end of the second surface S2 contacts the first surface S1. Referring to FIG. 1 and FIG. 2, which shows a plane view of the protrusion P1, the protrusion P1 has a first portion 1 that is adjacent to the first surface S1 and has a first width, a second portion 2 that is connected to the first portion 1 and has a second width increasing away from the first portion 1, and a third portion 3 that is connected to the second portion 2 and extends to the second end of the second surface S2 and has a third width greater than the first width. The second width of the second portion 2 in the region that contacts the first portion 1 may be equal to the first width of the first portion 1, and the second width of the second portion 2 in the region that contacts the third portion 3 may be equal to the third width of the third portion 3. The height of the protrusion P1 may be about 50 nm, and the length of the first portion 1 along the X-axis may be 20-150 nm, preferably 30-50 nm. The structure of the protrusion P1 is not limited to the shape shown in FIGS. 1 and 2. The location of the protrusion P1 may also vary. In FIG. 1, the protrusion P1 is formed on a side of the center portion of the second surface S2 so as to extend lengthwise in the Y direction, but the protrusion P1 may also be formed on the center portion or on the other side of the center portion.

In the first portion 1 of the protrusion P1, a source 20, a drain 30, and a channel C1 may be formed. The source 20 and the drain 30 may be formed in both sides of the first portion 1 along the X-axis, respectively, and the channel C1 is formed between the source 20 and the drain 30. The source 20 and the drain 30 may extend to the substrate 10 on both sides of the first portion 1, and to the substrate 10 on both sides of the second portion 2. The source 20 and the drain 30 may also each be formed in both ends of the second portion 2 along the X-axis, respectively. The source 20 and the drain 30 may preferably be formed symmetrically around the protrusion P1. The form and size of the source 20 and the drain 30 may vary. For example, the source 20 and the drain 30 may also be formed in the substrate 10 on both sides of the third portion 3.

The source 20, the drain 30, and the channel C1 constitute a resistance sensor to read information written in a recording medium. The source 20 and the drain 30 may be regions that are doped with first conductive impurities to a high density, and the channel C1 may be a region that is doped with first or second conductive impurities to a low density. For example, the source 20, the channel C1, and the drain 30 may be n+, p−, and n+ regions, n+, n−, and n+ regions, p+, n−, and p+ regions, or p+, p−, and p+ regions, respectively. The electric resistance of the channel C1 varies according to the surface charge of a recording medium that is adjacent to the channel C1 and the intensity of the current between the source 20 and the drain 30 also varies.

An insulating layer 40 and a conductive layer 50 may be sequentially formed on both sides of the protrusion P1 along the X-axis. Each of the source 20 and the drain 30 and the conductive layer 50 are electrically separated by the insulating layer 40. The insulating layer 40 may be formed on the protrusion P1 and the substrate 10 on both sides of the protrusion P1 to cover the resistance sensor, preferably to conform to the protrusion P1 and the substrate 10 on both sides of the protrusion P1. Two conductive layers 50 are formed on both sides of the resistance sensor according to the moving direction of the head (that is, in the direction of the X-axis). The two conductive layers 50 may function as shield layers to shield an interference electric field during a reading operation. To this end, during the reading operation, the two conductive layers 50 may be grounded. In detail, when reading information stored in a first bit area of a recording medium using the resistance sensor, the two conductive layers 50 function as shield layers shielding the interference electric fields that are generated in areas adjacent to other bit areas except the first bit area. The interference electric field escapes through the two conductive layers 50 to a ground line that is connected to the two conductive layers 50. Accordingly, the resolution of the resistance sensor can be increased by the conductive layers 50.

One of the conductive layers 50 may be used as a write electrode. That is, during a writing operation, a writing voltage is applied to one of the two conductive layers 50 (hereinafter, 'a first conductive layer') to use the first conductive layer as a write electrode. A ground voltage can be applied to the other conductive layer (hereinafter, 'a second conductive layer').

A passivation layer 60 may be formed on the second surface S2 to cover the insulating layer 40 and the conductive layers 50. The relative position of the resistance sensor in the direction of a Z-axis over the electric field read/write head 100 can be adjusted according to the thickness of the passivation layer 60.

An air bearing surface (ABS) pattern layer 70 may be formed on the first surface S1 of the substrate 10. The ABS pattern layer 70 functions to position the electric field read/write head 100 including the ABS pattern layer 70 over the surface of the recording medium. Although not illustrated in the drawings, electrodes may be formed which are in contact with the source 20, the drain 30, and the conductive layers 50, respectively.

FIGS. 3A through 3G show a method of manufacturing the electric field read/write head, according to an exemplary embodiment of the present invention.

Figure 3A:
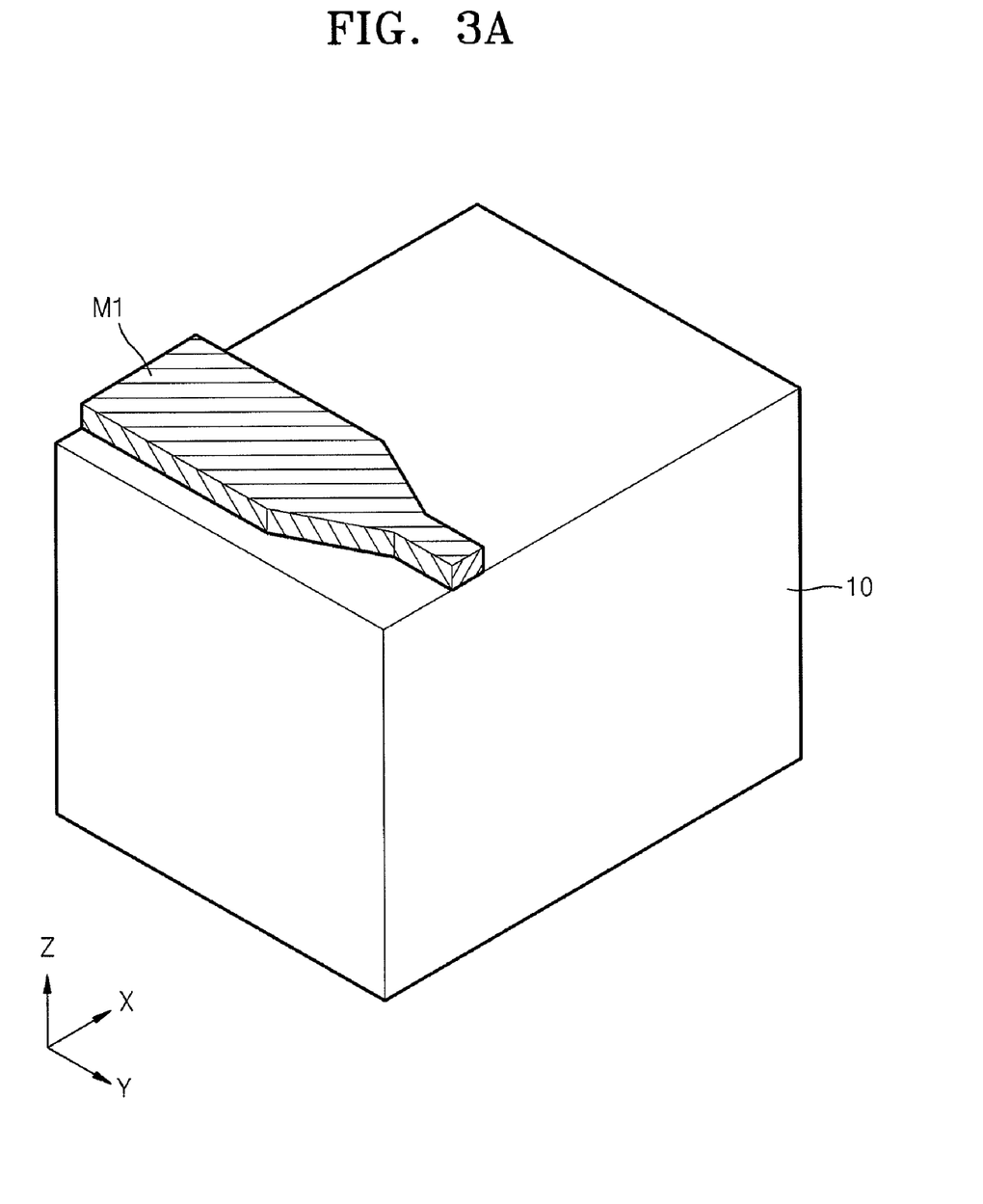
FIGS. 3A through 3G are perspective views for illustrating a method of manufacturing the electric field read/write head of FIG. 1, according to an exemplary embodiment of the present invention.

Referring to FIG. 3A, a first mask layer M1 is formed on a p-type or an n-type semiconductor substrate 10. The first mask layer M1 may extend from a first end to a second end on the substrate 10 in the direction of Y-axis; for example, the first mask layer M1 may have the same structure as the protrusion P1 of FIG. 1.

Figure 3B:
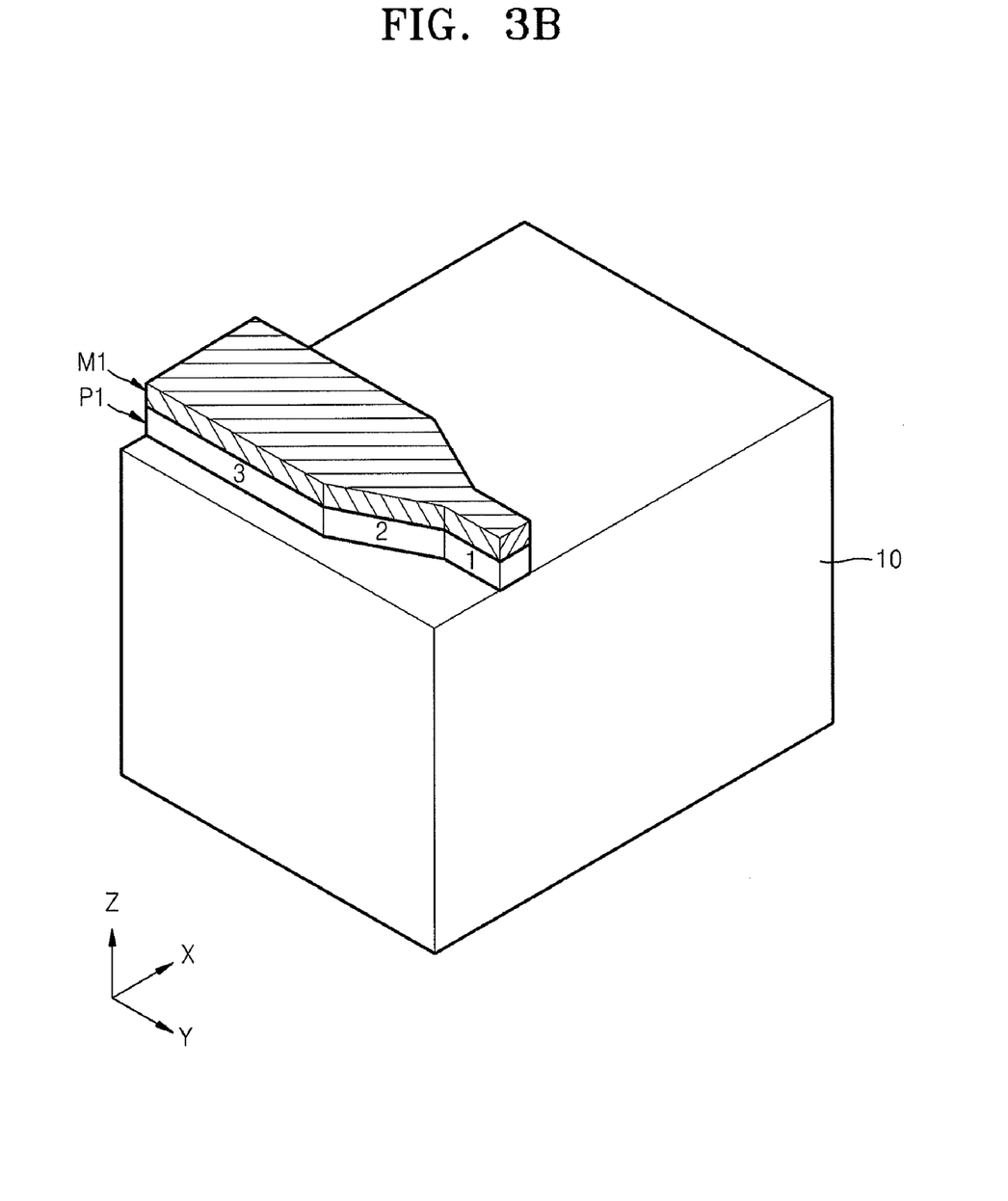

The substrate 10 on both sides of the first mask layer M1 is etched to a predetermined depth to form a protrusion P1 as illustrated in FIG. 3B. The protrusion P1 can be distinguished by first through third portions 1 through 3, and these portions may be the same as the first through third portions 1 through 3 of FIG. 2.

Figure 3C:
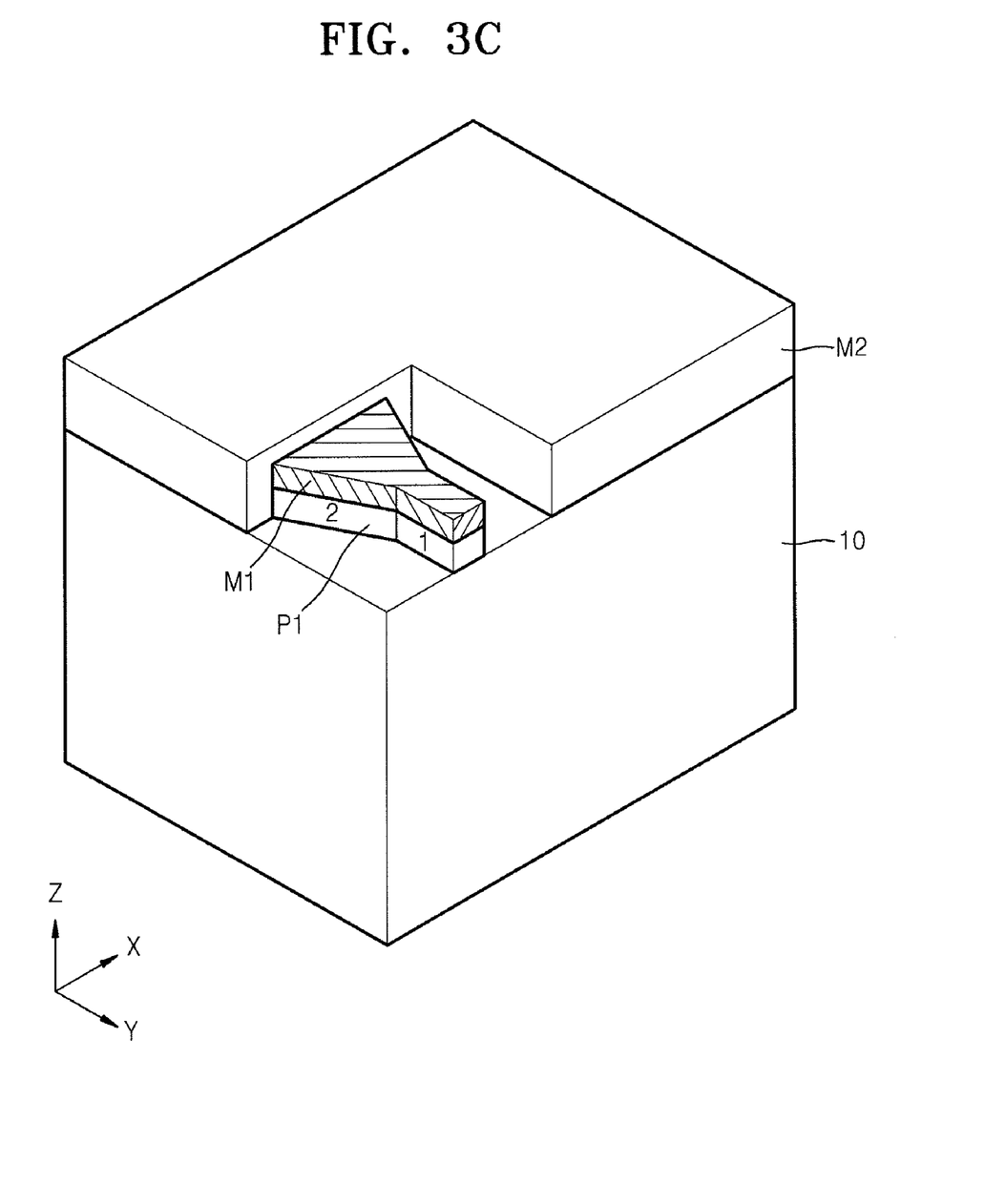

Referring to FIG. 3C, a second mask layer M2 covering a portion of the substrate 10 and a portion of the first mask layer M1 is formed. A portion of the first mask layer M1 formed on the first and second portions 1 and 2 and the substrate 10 on both sides thereof are exposed by the second mask layer M2. The substrate 10 exposed by the second mask layer M2 may be symmetrical around the first mask layer M1.

Figure 3D:
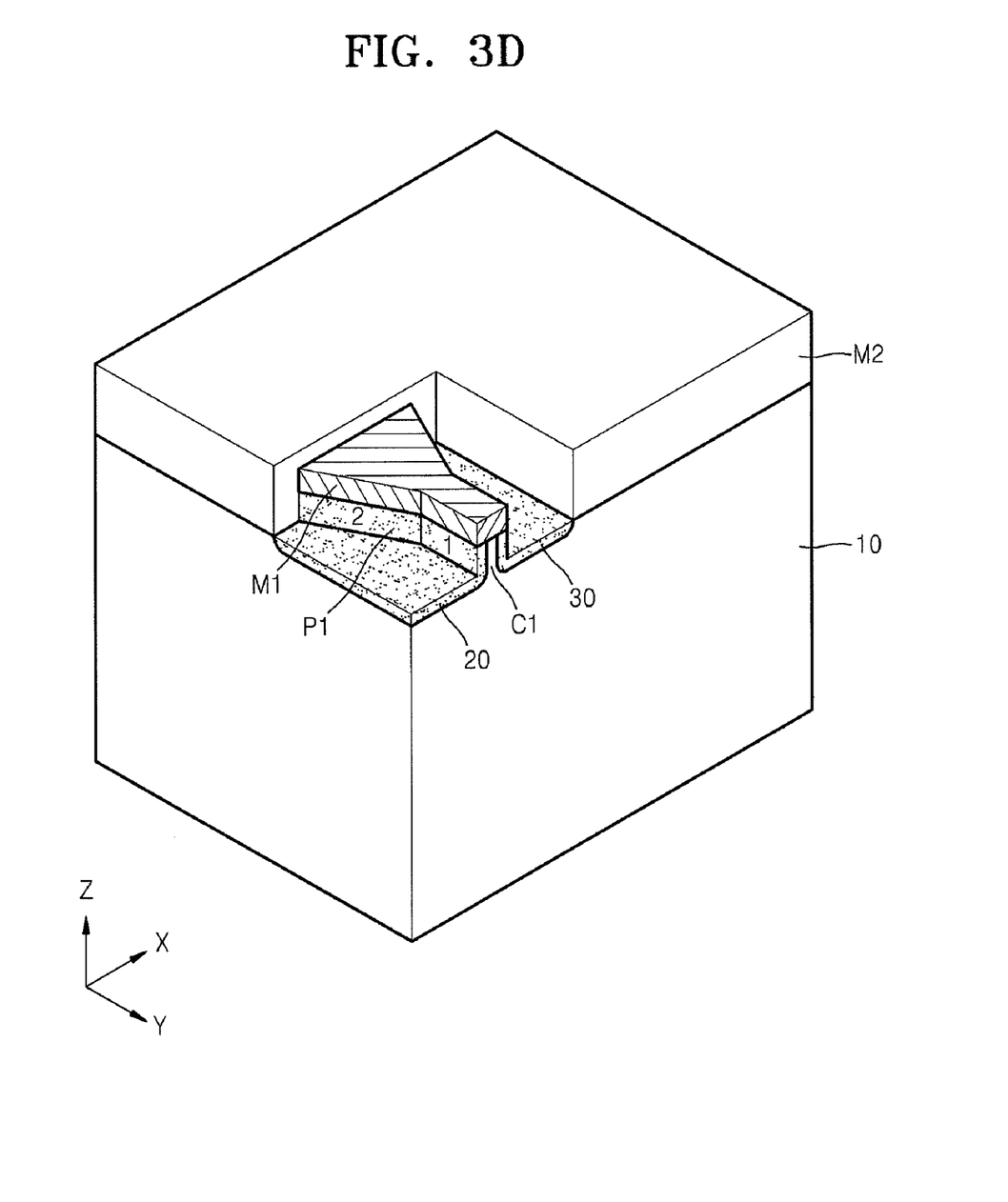

Referring to FIG. 3D, using the first and second mask layers M1 and M2 as an ion injection mask, the first and second portions 1 and 2, and the substrate 10 on both sides of the first and second portions 1 and 2 are injected with n-type or p-type impurity ions to a high density. The ions may be injected by an inclination ion injection process. The inclination ion injection process can be performed in two steps, and between the two steps, the substrate 10 may be rotated by 180°. As a result of the inclination ion injection process, high density doping regions can be formed in both ends of the first and second portions 1 and 2 in the direction of an X-axis and in the substrate 10 on both sides of the first and second portions 1 and 2. The high density doping regions are formed of two separate regions; one of them is a source 20 and the other one is a drain 30. A channel C1 is formed between the source 20 and the drain 30 of the first portion 1. The source 20, the channel C1, and the drain 30 may be n+, p−, and n+ regions, n+, n−, and n+ regions, p+, n−, and p+ regions, or p+, p−, and p+ regions, respectively. The source 20, the drain 30, and the channel C1 constitute a resistance sensor to read information written on a recording medium.

Figure 3E:
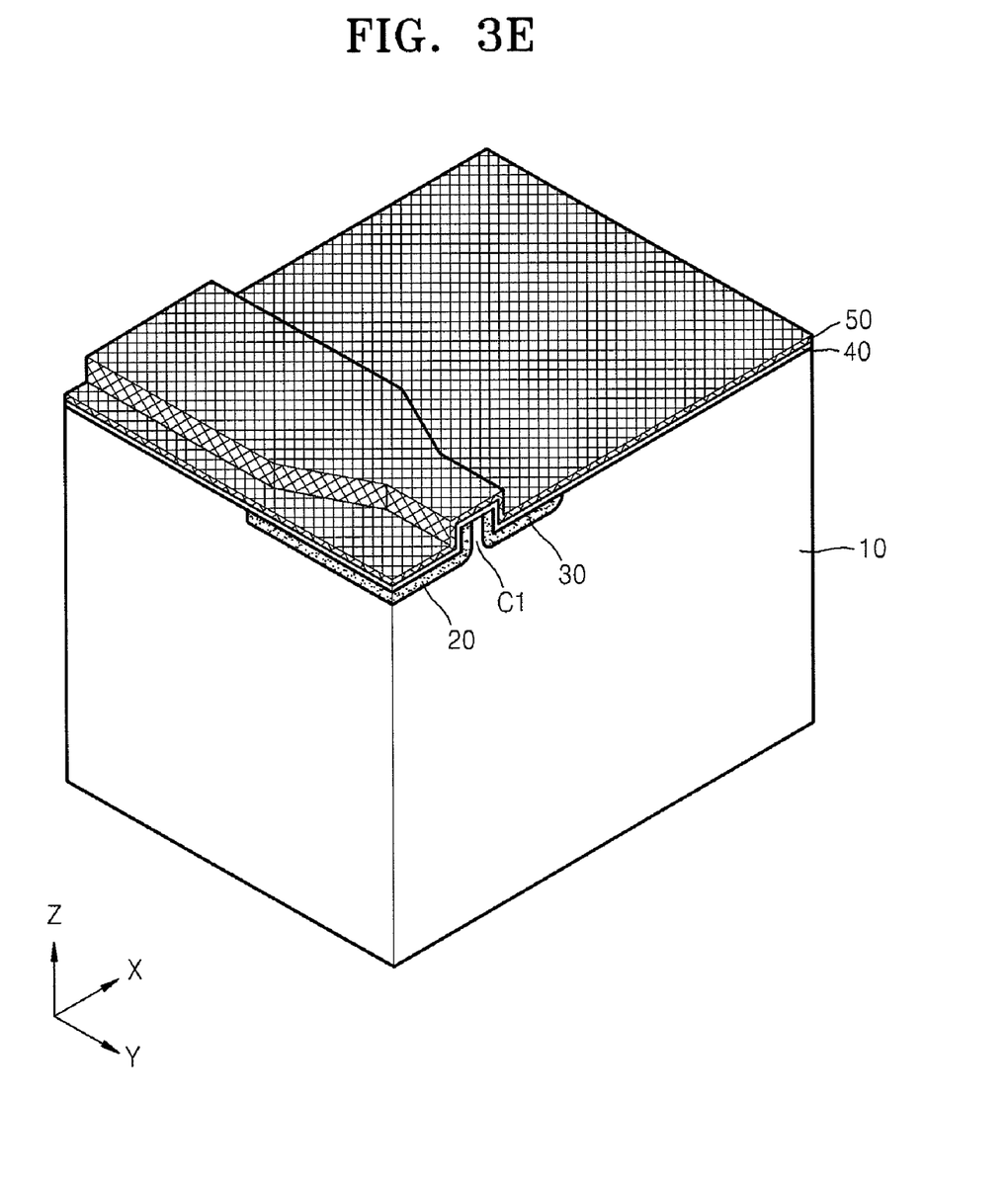

After removing the first and second mask layers M1 and M2, as illustrated in FIG. 3E, an insulating layer 40 covering the protrusion P1 is formed on the substrate 10, and a conductive layer 50 is formed on the insulating layer 40. The insulating layer 40 and the conductive layer 50 may preferably be formed to conform to the protrusion P1 and the substrate 10.

Figure 3F:
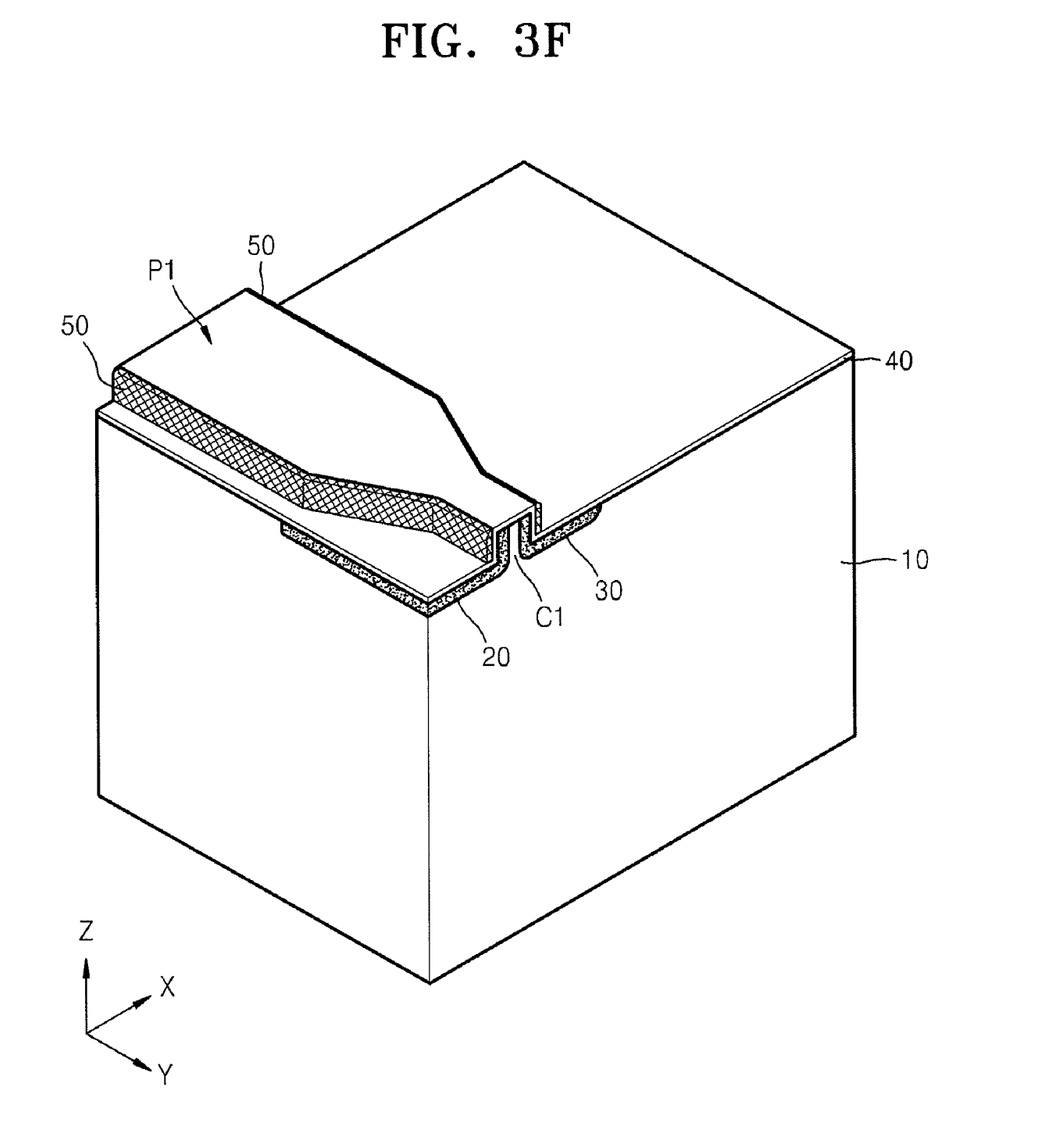
Figure 4:
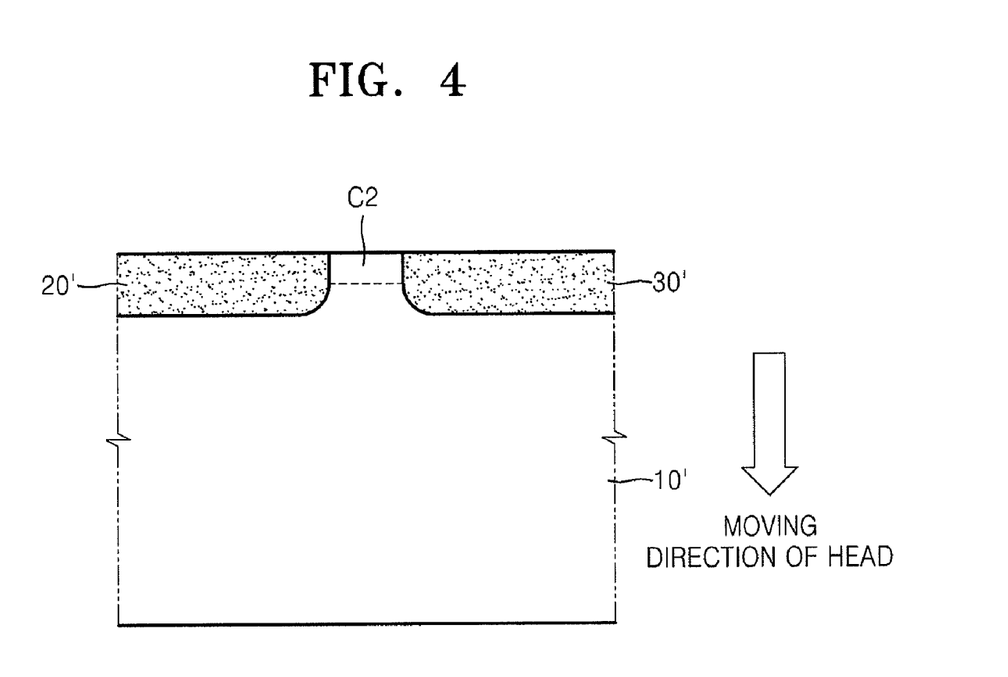
FIG. 4 is a cross-sectional view of an electric field read head according to a comparison example.

Next, the conductive layer 50 is anisotropically etched. The result of the anisotropic etching of the conductive layer 50 is illustrated in FIG. 3F. Referring to FIG. 3F, the insulating layer 40 on the protrusion P1 and on the substrate 10 is exposed, and the conductive layer 50 formed on both sidewalls of the protrusion P1 in the direction of the X-axis remains thereon. Two conductive layers 50 are present on both sides of the resistance sensor in the moving direction of the head, which is the same as the moving direction of the head of FIG. 1, that is, the direction of the X-axis. The two conductive layers 50 are grounded during a reading operation to function as shield layers to shield an interference electric field. In the current embodiment of the present invention, the protrusion P1 is formed on the substrate 10, and the resistance sensor is formed on the protrusion P1, and then conductive layers 50 are formed on both sides of the protrusion P1, thereby easily forming shield layers for the resistance sensor. When forming a planar type resistance sensor on a planar substrate, one of the two shield layers needs to be included in the substrate. However, this is difficult. In detail, as illustrated in FIG. 4, when forming a planar type resistance sensor formed of a source 20', a drain 30', and a channel C2 in a planar substrate 10', shield layers for the resistance sensor need to be formed on and under the channel C2. However, it is difficult to form a shield layer in the substrate 10' under the channel C2.

Figure 3G:
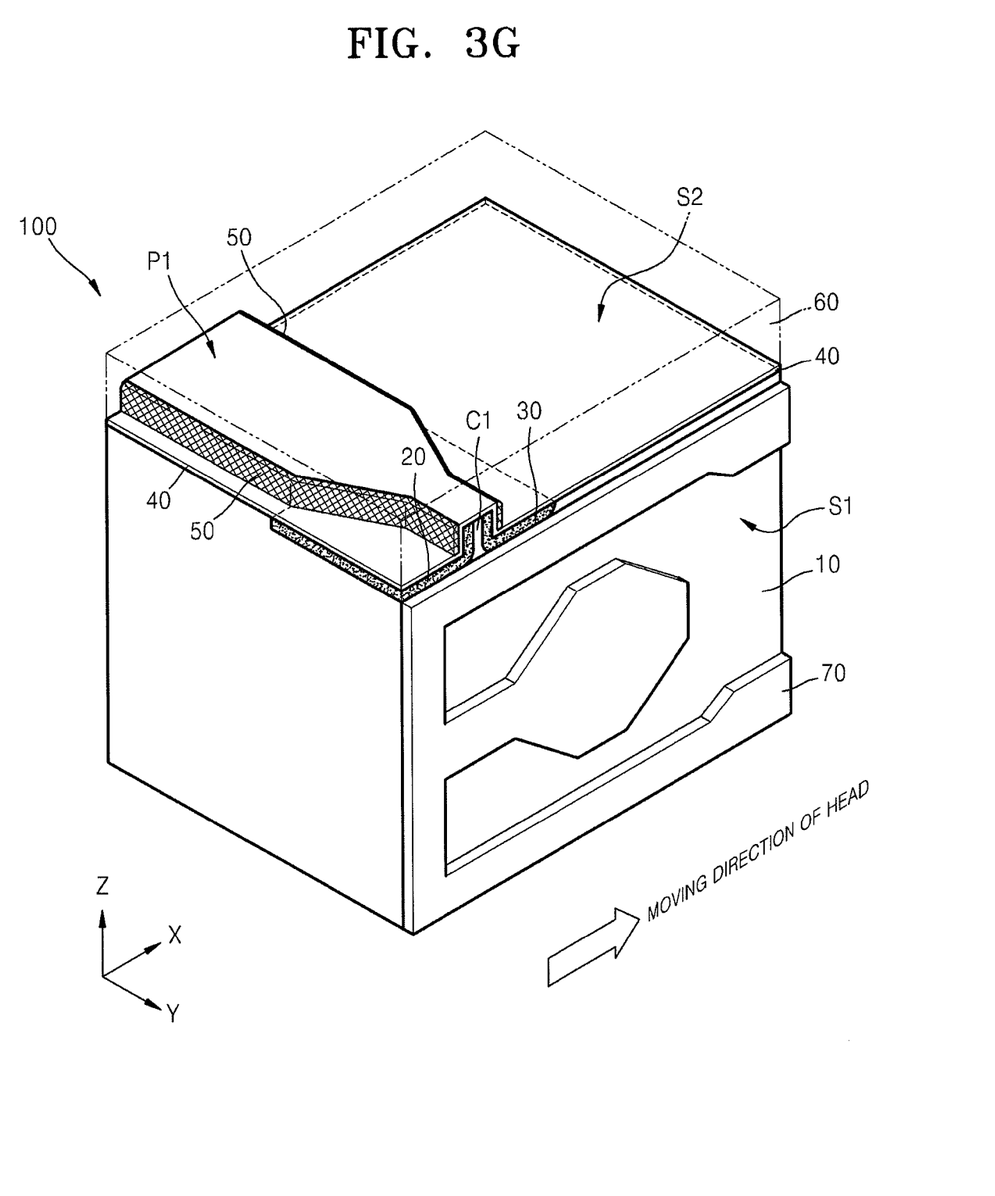

Referring to FIG. 3G, a passivation layer 60 is formed on the substrate 10 to cover the insulating layer 40 and the conductive layers 50. An ABS pattern layer 70 is formed on a surface of the substrate 10 facing the recording medium. Although not illustrated in the drawings, between the operation of forming the passivation layer 60 and the operation of forming the ABS pattern layer, electrodes contacting a source 20, a drain 30, and conductive layers 50 can be formed.

Figure 5:
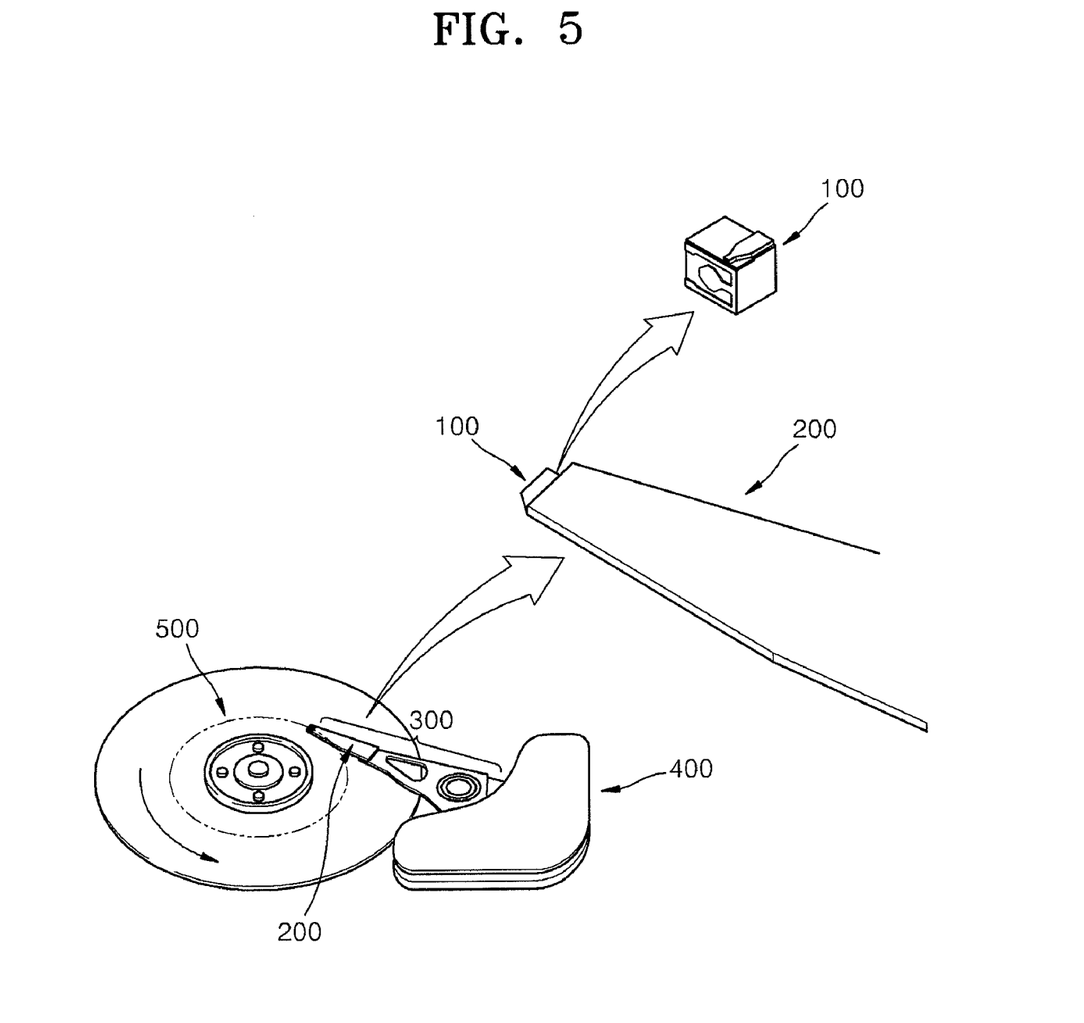
FIG. 5 is a perspective view of an information storage device including the electric field read/write head of FIG. 1, according to an exemplary embodiment of the present invention.

FIG. 5 is a perspective view of an information storage device including the electric field read/write head 100 according to an exemplary embodiment of the present invention.

Referring to FIG. 5, the information storage device includes a recording medium 500 including a ferroelectric recording layer, and an electric field read/write head 100 writing information on the recording medium 500 and reading information from the recording medium 500.

The recording medium 500 of the information storage device may be a rotating disk-type medium, and includes a grounded lower electrode (not shown) beneath thereof. The electric field read/write head 100 is attached to a suspension 200 at an end of a swing arm 300 and moves at a predetermined distance across the surface of the recording medium 500. Reference numeral 400 denotes a voice coil monitor (VCM) that rotates the swing arm 300. The driving system of the information storage device of the present invention is similar to that of an HDD.

The reading and writing operations of the inventive data read/write device will now be briefly described.

Reading Operation

When the source 20 and drain 30 of the electric field read/write head 100 are n+ regions, the resistance region is n−, and the surface of the recording medium 500 where the resistance region R is located, has a negative (−) charge, the density of electrons in the resistance region R is reduced so that the resistance value of the resistance region R increases and a current between the source 20 and drain 30 is reduced. Conversely, when the surface of the recording medium 500, where the channel is located, has a positive (+) charge, the electron density in the resistance region R increases so as to reduce the resistance value of the resistance region R and increase the current between the source 20 and drain 30. By detecting the changes in these resistance and current values, the data on the surface of the recording medium 500 can be read.

Writing Operation

When a positive (+) voltage exceeding a critical voltage is applied to one of the two conductive layers 50 (hereinafter, 'a first conductive layer') of the electric field read/write head 100, because the lower electrode disposed beneath the recording medium 500 is at 0V, the surface of the recording medium 500 becomes negatively (−) charged. On the other hand, when a negative voltage (−) under a critical voltage is applied to the first conductive layer of the electric field read/write head 100, because the lower electrode disposed beneath the recording medium 500 is at 0V, the surface of the recording medium 500 becomes positively (+) charged. Accordingly, the polarity of an electric domain of the ferroelectric recording medium 500 shifts according to the voltage applied to the first conducive layer and data can be written.

According to exemplary embodiments of the present invention, by using an electric field writing method in the case of the driving system of an HDD, an information storage system can be easily formed, and the data read/write device can be reliably driven while realizing a recording density of 1 Tb/in$^2$ or higher.

In particular, since a resistance sensor is formed on the protrusion of the substrate and electric field shield layers are formed on the both sides of the resistance sensor, the resolution of the resistance sensor can be improved.

Also, since one of the electric field shield layer can be used as a write electrode, a read/write head can be easily realized.

While the present invention has been particularly shown and described with reference to exemplary embodiments thereof, the exemplary embodiments should be considered in a descriptive sense only and not for purposes of limitation. For example, it will be understood by those skilled in the art that the structure of the protrusion P1, the source 20, and the drain 30 in FIG. 1 can be modified in various manners. Also, the conductive layers 50 may not be used as write electrodes and the electric field head of the present invention may be used as read only head. Therefore, the scope of the invention is defined not by the detailed description of the invention but by the appended claims.

What is claimed is:

1. An electric field head comprising:
    a substrate having a first surface facing a recording medium and a second surface that is perpendicular to the first surface; and
    a protrusion protruding from the second surface and having at least a portion facing the recording medium,
    wherein the protrusion includes a resistance sensor comprising a source, a drain, and a channel,
    wherein the protrusion is extended from a first end to a second end of the second surface in a direction perpendicular to the first surface; and
    wherein the source, the drain, and the channel are formed in the protrusion adjacent to the first surface so as to be perpendicular to the first surface, the source and the drain are formed at a first side and a second side of the protrusion, and the channel is formed between the source and the drain.

2. The electric field head of claim 1, further comprising an air bearing surface (ABS) pattern layer on the first surface of the substrate.

3. An electric field head comprising:
    a substrate having a first surface facing a recording medium and a second surface that is perpendicular to the first surface; and
    a protrusion protruding from the second surface and having at least a portion facing the recording medium,
    wherein the protrusion includes a resistance sensor comprising a source, a drain, and a channel, and
    wherein an insulating layer and an electric field shield layer are further sequentially formed on each of opposite sides of the protrusion that do not face the recording medium.

4. The electric field head of claim 3, wherein the electric field shield layer is a conductive layer.

5. The electric field head of claim 4, wherein at least one of the electric field shield layers on opposite sides of the protrusion is a writing electrode.

6. The electric field head of claim 1, wherein the source and the drain respectively extend to the substrate on opposite sides of the protrusion.

7. A method of manufacturing an electric field head comprising a reading unit, the method comprising:
   forming a protrusion on a substrate protruding from a surface of the substrate which is perpendicular to the recording medium, the protrusion formed from a first end to a second end of the surface in a direction perpendicular to a first surface of the electric field head which faces the recording medium; and
   forming a source and a drain on a portion of the protrusion facing a recording medium;
   wherein the source, the drain, and a channel are formed in the protrusion adjacent to the first surface so as to be perpendicular to the first surface, the source and the drain are formed at a first side and a second side of the protrusion, and the channel is formed between the source and the drain.

8. The method of claim 7, further comprising, after forming the source and the drain, forming an air bearing surface (ABS) pattern layer on a surface of the electric field head facing the recording medium.

9. A method of manufacturing an electric field head comprising a reading unit, the method comprising:
   forming a protrusion on a substrate protruding from a surface of the substrate which is perpendicular to the recording medium; and
   forming a source and a drain on a portion of the protrusion facing a recording medium,
   after forming the source and the drain:
      forming an insulating layer covering at least two sides of the protrusion on the substrate which face each other; and
      forming an electric field shield layer on the insulating layer formed on the sides of the protrusion that face each other.

10. The method of claim 9, wherein the electric shield layer is a conductive layer.

11. The method of claim 10, wherein at least one of the electric shield layers disposed on the sides of the protrusion is a write electrode.

12. The method of claim 9, wherein the source and the drain are respectively formed to extend to the substrate on opposite sides of the protrusion.

13. An information storage device comprising an electric field head and a recording medium including a ferroelectric recording layer, wherein the electric field head comprises:
   a substrate having a first surface facing the recording medium and a second surface that is perpendicular to the first surface; and
   a protrusion protruding from the second surface and having at least a portion facing the recording medium,
   wherein a resistance sensor comprising a source, a drain, and a channel is included in the protrusion,
   wherein the protrusion extends from a first end to a second end of the second surface in a direction perpendicular to the first surface; and
   wherein the source, the drain, and the channel are formed in the protrusion adjacent to the first surface so as to be perpendicular to the first surface, and the source and the drain are formed at a first side and a second side of the protrusion, and the channel is formed between the source and the drain.

14. The information storage device of claim 13, wherein an ABS pattern layer is further formed on the first surface of the substrate.

15. The information storage device of claim 13, wherein the recording medium is a rotating disk-type medium, and the electric field head moves at a predetermined distance across a surface of the recording medium.

16. An information storage device comprising an electric field head and a recording medium including a ferroelectric recording layer, wherein the electric field head comprises:
   a substrate having a first surface facing the recording medium and a second surface that is perpendicular to the first surface; and
   a protrusion protruding from the second surface and having at least a portion facing the recording medium,
   wherein a resistance sensor comprising a source, a drain, and a channel is included in the protrusion, and
   wherein an insulating layer and an electric field shield layer are further sequentially formed on opposite sides of the protrusion that do not face the recording medium.

17. The information storage device of claim 16, wherein the electric field shield layer is a conductive layer.

18. The information storage device of claim 17, wherein at least one of the electric shield layers on opposite sides of the protrusion is a write electrode.

19. The information storage device of claim 13, wherein the source and the drain respectively extend to the substrate on opposite sides of the protrusion.

* * * * *